Sept. 6, 1966 L. HIDEG ETAL 3,270,721
INTERNAL COMBUSTION ENGINE COMBUSTION CHAMBERS
Filed Jan. 2, 1964 4 Sheets-Sheet 1

ALADAR O. SIMKO
LASZLO HIDEG
THOMAS M. SEBESTYEN
INVENTORS

BY John R. Faulkner
Ernest A. Beutler
ATTORNEYS

Sept. 6, 1966 L. HIDEG ET AL 3,270,721
INTERNAL COMBUSTION ENGINE COMBUSTION CHAMBERS
Filed Jan. 2, 1964 4 Sheets-Sheet 2
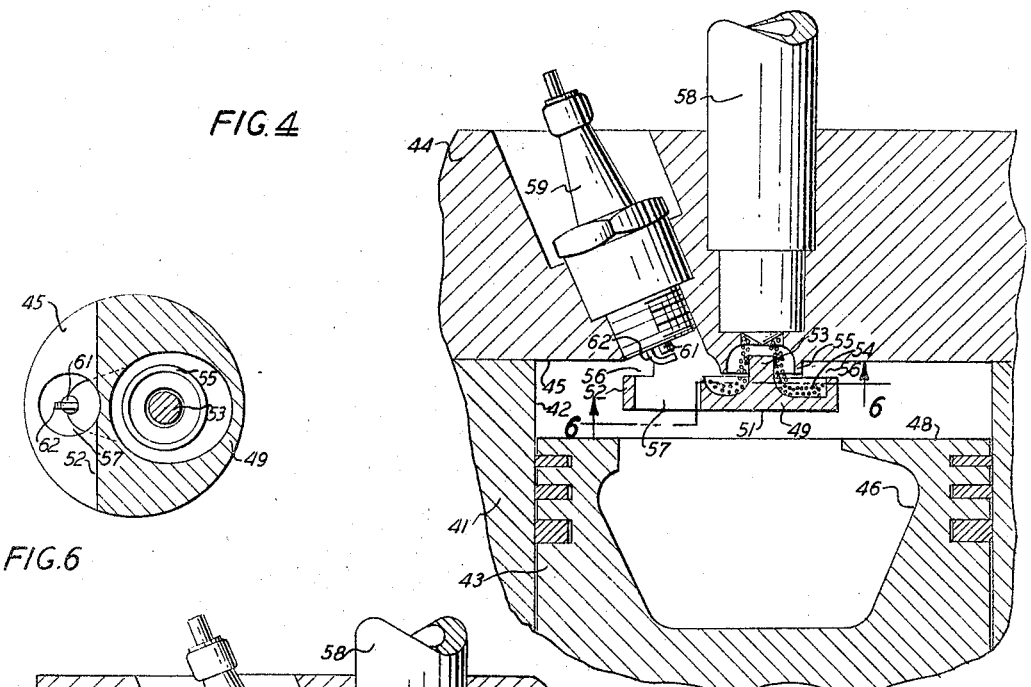
FIG. 4
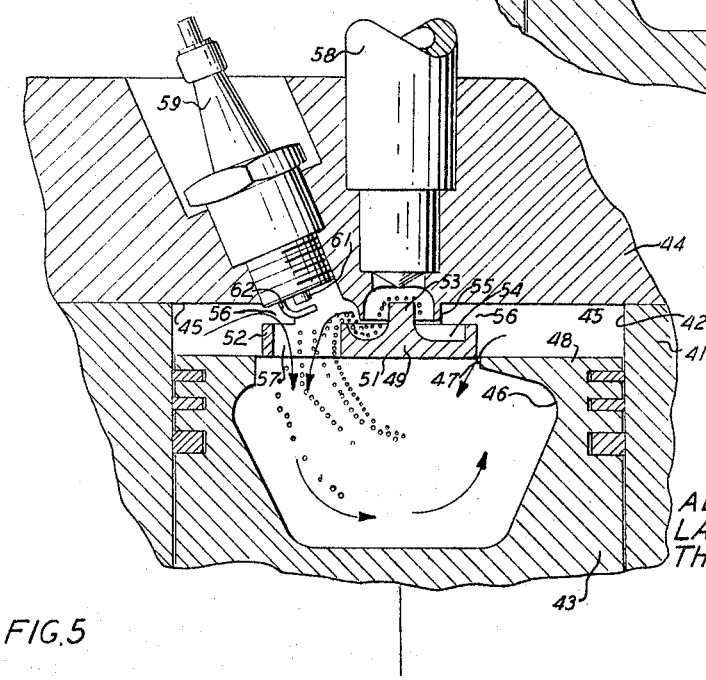
FIG. 6
FIG. 5
ALADAR O. SIMKO
LASZLO HIDEG
THOMAS M. SEBESTYEN
INVENTORS
BY John R. Faulkner
Ernest A. Beutler
ATTORNEYS

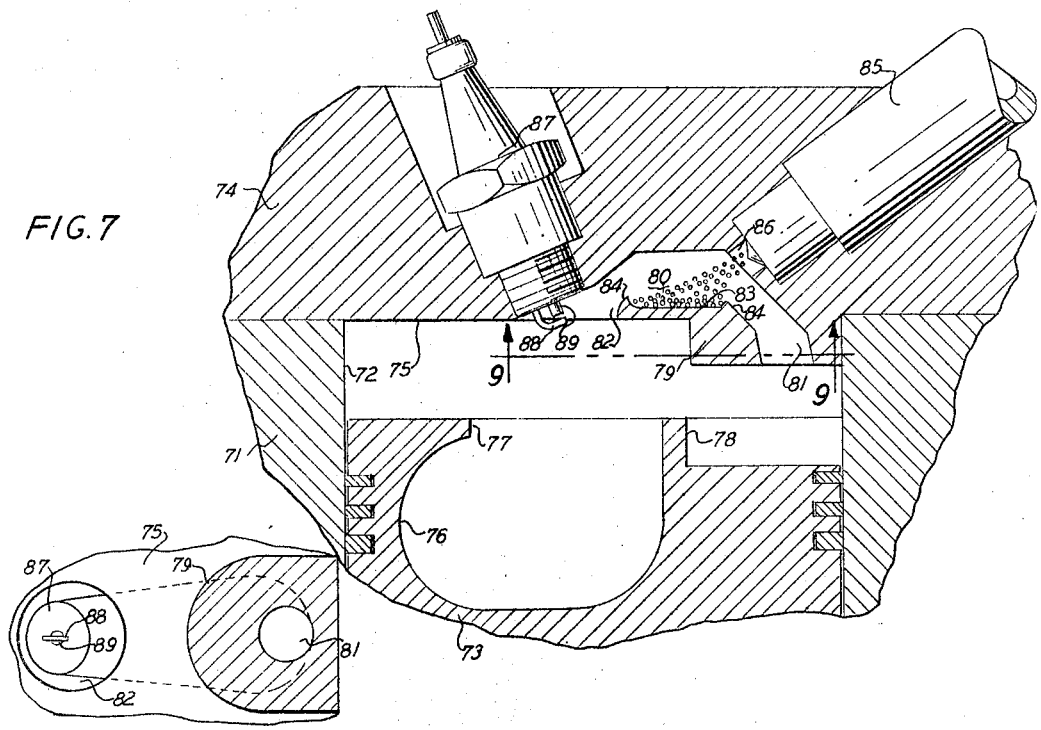
FIG. 7
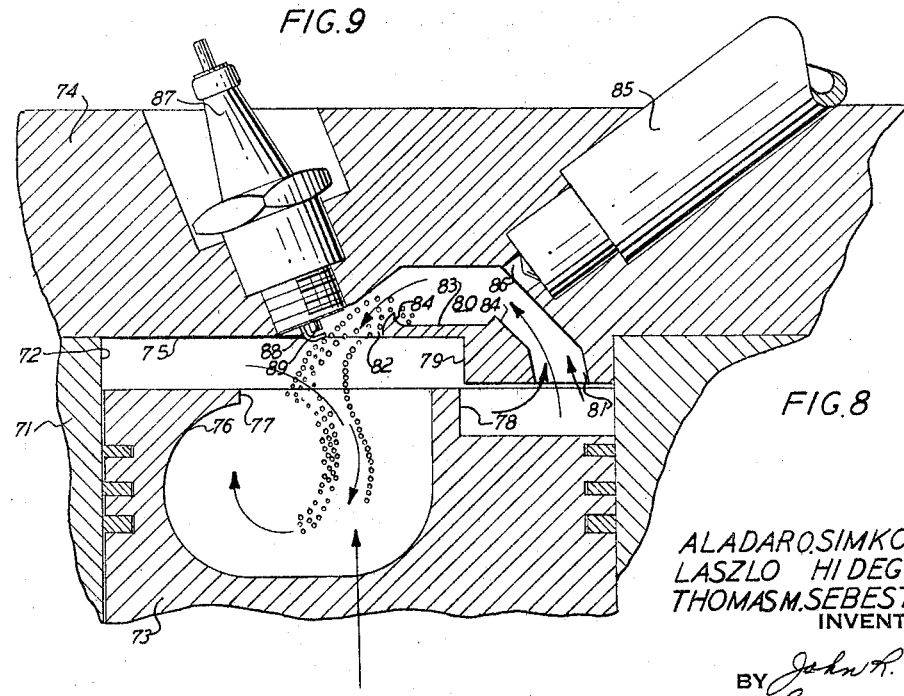
FIG. 9
FIG. 8
ALADAR O. SIMKO
LASZLO HIDEG
THOMAS M. SEBESTYEN
INVENTORS
BY John R. Faulkner
Ernest A. Beutler
ATTORNEYS Sept. 6, 1966   L. HIDEG ETAL   3,270,721
INTERNAL COMBUSTION ENGINE COMBUSTION CHAMBERS
Filed Jan. 2, 1964   4 Sheets-Sheet 4
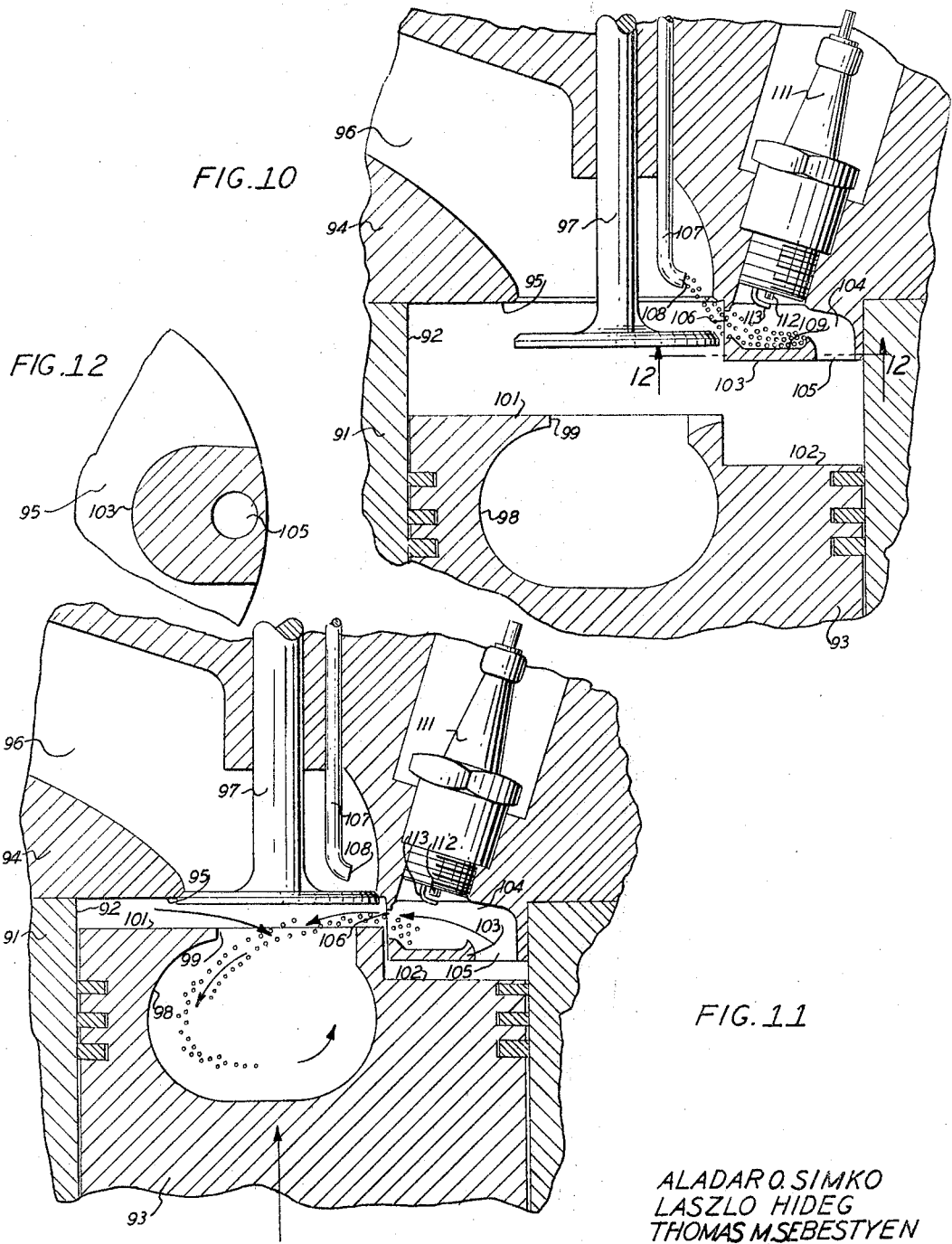
ALADAR O. SIMKO
LASZLO HIDEG
THOMAS M. SEBESTYEN
INVENTORS
BY John R. Faulkner
Ernest A. Beutler
ATTORNEYS

United States Patent Office 3,270,721
Patented Sept. 6, 1966

3,270,721
INTERNAL COMBUSTION ENGINE COMBUSTION CHAMBERS
Laszlo Hideg, Dearborn Heights, Thomas M. Sebestyen, Taylor, and Aladar O. Simko, Detroit, Mich., assignors to Ford Motor Company, Dearborn, Mich., a corporation of Delaware
Filed Jan. 2, 1964, Ser. No. 335,321
20 Claims. (Cl. 123—32)

This invention relates to combustion chambers for internal combustion engines and more particularly to combustion chambers that permit unthrottled engine operation.

An internal combustion engine operating upon a conventional combustion process can only realize its maximum efficiency at full power for several reasons. Since in many applications an internal combustion engine is rarely called upon to develop its full power, an engine running on the conventional combustion process cannot be operated as economically as might otherwise be possible.

When running upon a conventional combustion process, a substantially homogeneous mixture of fuel and air is present in the combustion chamber at the time of ignition. Since there must be an ignitable mixture present at the time of ignition, there is an overabundance of fuel present in the combustion chamber except when full power output is required. That is, although there must be a locally rich mixture to initiate combustion, there is more fuel present in the chamber than is required to provide the desired power at partial loads. Therefore, a high specific fuel consumption at light and medium loads is unavoidable with a conventional engine.

Because of the overabundance of fuel at light loads, the power output must be regulated by throttling the intake air. The restriction to air flow caused by throttling raises the temperature of the charge in the cylinder and decreases the volumetric efficiency of the engine. The heated charge also increases the possibility of detonation necessitating the use of either lower compression ratios or higher octane fuels. The throttling of intake air in a conventional engine thus further increases the cost of operation by decreasing volumetric efficiency and by decreasing the thermal efficiency through the necessity of employing lower compression ratios or, alternatively, by requiring the burning of higher cost fuels.

It is, therefore, the principal object of this invention to provide combustion chambers that permit the unthrottled operation of an internal combustion engine.

It is a further object of this invention to provide combustion chambers that permit the formation of a locally rich fuel-air mixture around the ignition device at the time of ignition. The power output of the engine is then varied by altering the total amount of fuel present in the combustion chamber.

To achieve the foregoing objects, combustion chambers are provided in which the minimum clearance volume at top dead center comprises a squish area and a cavity. A squish induced air transfer takes place from the squish area into the cavity. A fuel evaporation chamber is also provided into which at least a portion of the fuel is injected. The fuel evaporation chamber is open at one side to the squish area and at another side to the cavity so that a portion of the squish induced air transfer takes place through the fuel evaporation chamber. An ignition device is positioned contiguous to the outlet of the fuel evaporation chamber so that a rich fuel-air mixture will be swept past the ignition device at the time of ignition.

An internal combustion engine embodying this invention has a cylinder, a piston reciprocating in the cylinder and a cylinder head enclosing the cylinder. A cavity formed in the engine opens through a throat into the cylinder. The cavity forms a substantial portion of the clearance volume when the piston is at top dead center to establish a squish induced air transfer through the throat into the cavity during compression. A fuel impingement surface in the clearance volume is positioned to be traversed by at least a portion of the squish induced air transfer. A fuel injection nozzle is directed to deposit a substantial portion of its fuel spray as a liquid upon the fuel impingement surface during injection. The deposited fuel is transferred into the cavity upon compression by the squish induced air flow across the fuel impingement surface. An ignition device is exposed contiguous to the fuel impingement surface to ignite the fuel as it is swept into the cavity.

In a first embodiment of the invention, the cavity is formed in the head of the piston and the fuel impingement surface is formed in the cylinder head. In this embodiment the fuel injection nozzle and ignition device may also be supported by the cylinder head.

In other embodiments of the invention, a second cavity is formed in either the head of the piston or in the cylinder head. A projection that extends from the other member is adapted to displace a substantial portion of the volume of the second cavity when the piston is at top dead center. The fuel impingement surface may be formed in part in the projection.

In a still further embodiment of the invention, the cavity is formed in the piston head and a projection extends from the cylinder head into the throat of the cavity during the latter stages of the compression stroke. The projection is of substantially the same size and shape as the throat to obstruct the squish induced air transfer through the throat. The fuel impingement surface is formed in the projection and opens through a side wall of the projection into the squish area. The fuel impingement surface is also open at the lower end of the projection to the cavity in the piston.

Further objects and advantages of this invention will become more apparent as this description proceeds, particularly when considered in conjunction with the accompanying drawings, wherein:

FIGURE 4 is a cross-sectional view taken through a cylinder of an internal combustion engine illustrating the second embodiment of this invention.

FIGURE 5 is a cross-sectional view, in part similar to FIGURE 4, showing the piston at its top dead center position.

FIGURE 6 is a cross-sectional view taken along line 6—6 of FIGURE 4.

FIGURE 7 is a cross-sectional view taken through the cylinder of an internal combustion engine illustrating a third embodiment of this invention.

FIGURE 8 is a cross-sectional view, in part similar to FIGURE 7, showing the piston at its top dead center position.

FIGURE 9 is a cross-sectional view taken along line 9—9 of FIGURE 7.

FIGURE 10 is a cross-sectional view taken through the cylinder of an internal combustion engine illustrating a fourth embodiment of this invention.

FIGURE 11 is a cross-sectional view, in part similar to

FIGURE 10, showing the piston at its top dead center position.

FIGURE 12 is a cross-sectional view taken along line 12—12 of FIGURE 10.

The combustion process upon which all of the disclosed embodiments operate, is substantially the same. The process will be described more fully after the physical construction of all of the embodiments has been detailed.

Figure 1:
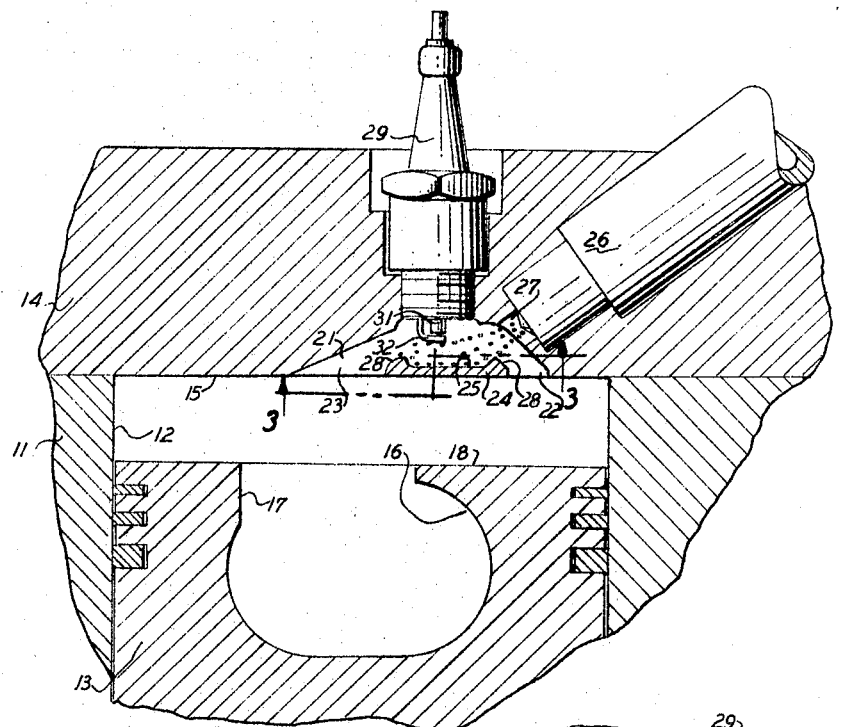
FIGURE 1 is a cross-sectional view taken through the cylinder of an internal combustion engine illustrating a first embodiment of the invention.
Figure 3:
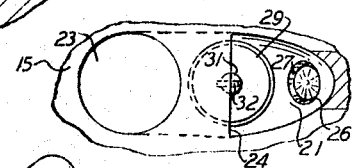
FIGURE 3 is a cross-sectional view taken along line 3—3 of FIGURE 1.
Figure 2:
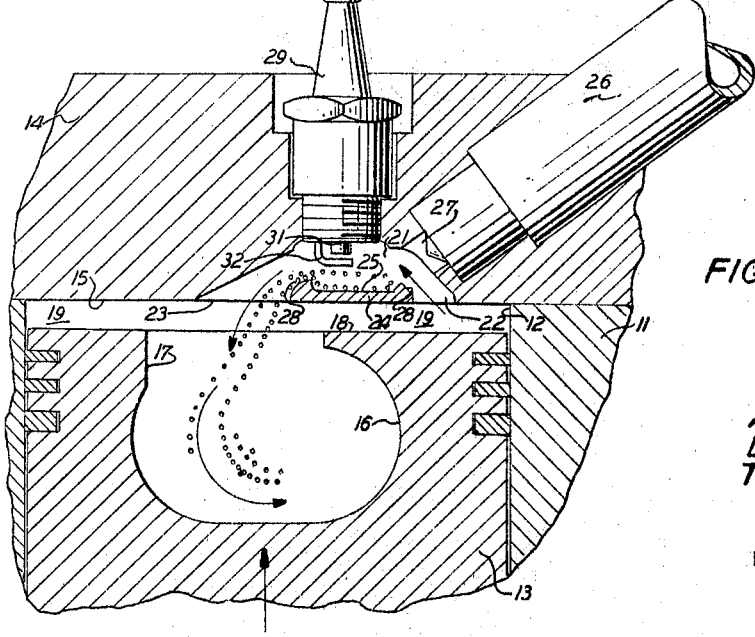
FIGURE 2 is a cross-sectional view, in part similar to FIGURE 1, showing the piston at its top dead center position.

Referring now to the drawings and in particular to the embodiment shown in FIGURE 1–3, a cylinder block 11 forms at least one cylinder bore 12. A piston 13 reciprocates in the cylinder bore 12. A cylinder head 14 having a lower surface 15 encloses the cylinder bore 12 to form a combustion chamber. In take and exhaust values (not shown) control the flow of gases to and from the cylinder bore 12 through intake and exhaust ports (not shown) formed in the cylinder head 14. The stems of the intake and exhaust valves have their axes in a common plane that is parallel to the axis of the cylinder bore 12. The lower surface of the value heads lie in substantially the same plane as the lower cylinder head surface 15 when the valves are closed to present a plane surface above the piston 13.

A cavity 16 having a generally ellipsoidal shape is formed in the head of the piston 13 concentric with the axis of the cylinder bore 12. The ellipsoidal cavity 16 opens at one side thereof into the cylinder bore 12 through a throat 17. At top dead center (FIGURE 2), the piston head area 18 surrounding the throat 17 is closely spaced from adjacent, lower cylinder head surface 15 to form a squish area 19. The volume of the cavity 116 is sufficient to permit the piston to cause a squish induced air transfer from the squish area 19 into the cavity 16 through the throat 17 as the piston 13 approaches top dead center. The direction of air flow is indicated by the arrows in FIGURE 2.

A fuel evaporation chamber 21 is formed in the cylinder head 14. The fuel evaporation chamber 21 has an inlet opening 22 formed in the lower cylinder head surface 15 opening into the squish area 19 and overlying the piston head area 18. An outlet opening 23 is formed in the lower surface 15 of the cylinder head 14 above the throat 17. The lower end of the fuel evaporation chamber 21 is bounded by a portion 24 of the cylinder head 14 having an upper surface 25 that functions as a fuel impingement surface in the manner to be described.

A fuel injection nozzle 26 is obliquely disposed in the cylinder head 14. The fuel injection nozzle 26 discharges from its discharge orifice through a short transfer channel 27 directly into the fuel evaporation chamber 21. The discharge orifice of the fuel injection nozzle 26 is disposed so that a major portion of the injected fuel will be deposited as a liquid upon the fuel impingement surface 25. The fuel impingement surface 25 is surrounded by upturned edges 28 to assist in entrapping the fuel. A spark plug 29 is supported in a vertical position in the cylinder head 14. The spark plug 29 has its ignition terminals 31 and 32 extending into the fuel evaporation chamber 21.

In the combustion process that the engine operates upon, an unthrottled charge of pure air is drawn into the cylinder bore 12 on the intake stroke. The manner of varying the engine power output without throttling the intake air will be discussed after all embodiments have been described. At the later stage of the intake stroke or at the beginning of the compression stroke, the fuel injection nozzle 26 discharges a fuel spray into the fuel evaporation chamber 21. A major portion of the injected fuel is deposited as a liquid upon the fuel impingement surface 25 (FIGURE 1). The surface 25 is at an elevated temperature because of its proximity to the combustion chamber and thus the deposited fuel particles evaporate readily. The evaporation of the fuel particles and the presence of fuel that has not impinged upon the surface 25 causes a rich fuel-air mixture to be present in the fuel evaporation chamber 21.

As the piston 13 moves upwardly compressing the charge within the cylinder 12, a squish induced air transfer takes place from squish area 19 into the cavity 16 through the throat 17. A portion of the squish induced air transfer also takes place through the fuel evaporation chamber 21 from the inlet opening 22 to the outlet opening 23. The air transfer causes the rich fuel-air mixture to be driven from the fuel evaporation chamber 21 into the cavity 16 at a high velocity. The velocity and turbulence of air flow causes at least a partial mixing of the fuel-air mixture with the surrounding pure air in the cavity 16.

At the desired time, the spark plug 29 is fired by causing a spark to cross the terminals 31 and 32. The location of the terminals 31 and 32 is in the path of the transferred fuel-air mixture so that a stoichiometric mixture surrounds the terminals at the time of ignition. The combustion propagates rapidly into the remainder of the combustion chamber with an attendant temperature and pressure rise along the flame front. The rise in pressure in the fuel evaporation cavity 21 causes a high temperature stream of gases to issue from the discharge opening 23 into the cavity 16 to insure complete mixing and combustion.

Although the spark plug 29 is shown as having its ignition terminals 31 and 32 positioned in the fuel evaporation cavity 21, the spark plug could also be positioned at the mouth of the discharge opening 23. Ignition also will occur in this spark plug location inasmuch as a rich fuel-air mixture is being driven from the cavity 21 past the spark plug terminals at the time of ignition. By locating the spark plug 29 outside of the cavity 21, however, the rapid temperature and pressure rise that increases penetration into cavity 16 is decreased.

In certain instances it may be desirable to defer the transfer of the charge into the combustion cavity until later in the compression stroke. It may also be desirable to increase the penetration of the charge into the combustion cavity. The combustion chamber shown in FIGURES 4–6 permits the delayed transfer and increased penetration.

Referring now to the embodiment shown in FIGURES 4–6, a cylinder block 41 having cylinder bore 42 reciprocally supports a piston 43. A cylinder head 44 having a lower surface 45 encloses the cylinder bore 42. Intake and exhaust valves (not shown) control the flow of gases to and from the cylinder bore 42 through intake and exhaust ports (also not shown) formed in the cylinder head 44. The stems of the intake and exhaust valves have their axes in a common plane that is parallel to the axis of the cylinder bore 42. The lower sides of the valve heads lie substantially in the same plane as the lower cylinder head surface 45 to present a substantially uniform plane surface above the major portion of the piston 43.

A cavity 46 is formed in the head of the piston 43. The cavity 46 may be formed as any surface of revolution and is preferably concentric with the axis of the cylinder 41. An inverted truncated conical shape may be desirable. The cavity 46 opens into the cylinder bore 42 through a throat 47 that is offset to one side of the cavity 46. The cavity 46 has sufficient volume to promote a squish induced air transfer during compression from the minimum clearance area between the cylinder head lower surface 45 and a piston head surface 48 surrounding the throat 47.

A fuel evaporation plate 49 is secured to the cylinder head 44 in a position that overlies the throat 47. The fuel evaporation plate 49 has a lower surface 51 and side wall 52. The lower surface 51 and a portion of the side wall 52 are adapted to extend into the throat 47 when the piston 43 is at top dead center (FIGURE 5) and for a portion of the crank angle before top dead center. A modified toroidal shaped fuel impingement surface 53 is formed in the fuel evaporation plate 49 on the axis of the cylinder bore 42. The fuel impingement to provide a fuel evaporation cavity 54. A hollow cylindrical projection 55 of the cylinder head 44 extends into the fuel evaporation cavity 54 concentric with the fuel impingement surface 53. A plurality of inlet openings 56 are formed around the periphery of the side wall 52 above the portion that extends into the throat 47 at top dead center. An outlet opening 57 is formed in the lower surface 51 at one side of the fuel impingement surface 53.

A fuel injection nozzle 58 is positioned vertically in the cylinder head 44 with its discharge orifice located centrally in the hollow cylindrical projection 55. The discharge orifice of the fuel injection nozzle 58 overlies the peak of the fuel impingement surface 53 and sprays directly thereon during injection. The fuel deposited upon the fuel impingement surface 51 will evaporate rapidly because of the elevated temperature to fill the fuel evaporation cavity 54 with a rich fuel-air mixture.

During compression the rich fuel-air mixture is transferred through the outlet opening 57 into the cylinder bore 42 due to the squish induced air flow. The bulk of the fuel transfer will be deferred until the piston 43 closely approaches top dead center (FIGURE 5). At this time the periphery of the fuel evaporation plate 49 will obstruct the throat 47. All of the squish induced air transfer from the right hand squish area will then be forced to take place through the inlet openings 56 into the fuel evaporation cavity 54. The air is then discharged through the outlet opening 57 into the cavity 46. The high rate of air flow across the fuel impingement surface 53 will sweep any unevaporated liquid fuel from this surface through the opening 57 into the cavity 46.

A spark plug 59 is supported in the cylinder head 44 with its ignition terminals 61 and 62 overlying the discharge opening 57. A rich mixture of fuel and air will be present at the spark terminals 61 and 62 at the time of ignition because of the mixture transfer that is taking place. As the locally rich mixture is ignited, a rapid pressure and temperature rise will occur in the cavity 46. The increase in temperature will insure combustion of the leaner fuel-air mixture present in the cavity 46.

The increased penetration and delayed transfer of the charge achieved by the embodiment shown in FIGURES 4–6 may also be achieved through the use of a stepped piston configuration as shown in the embodiments of FIGURES 7–9 and FIGURES 10–12. Referring in detail to the embodiment shown in FIGURES 7–9, a cylinder block 71 has a cylinder bore 72 that reciprocally supports a piston 73. A cylinder head 74 has a lower surface 75 that encloses the cylinder bore 72. Intake and exhaust valves (not shown) control the flow of gases to and from the cylinder bore 72 through intake and exhaust ports (also not shown) formed in the cylinder head 74. The stems of the intake and exhaust valves have their axes in a common plane that is parallel to the axis of cylinder bore 72. The lower sides of the valve heads lie substantially in the same plane as the lower cylinder head surface 75 to present a substantially uniform plane surface above the major portion of the piston 73.

The piston 73 has a cavity 76 formed as a surface of revolution therein. The cavity 76 is open at one side thereof into the cylinder bore 72 through a throat 77. A second, segmented cylindrical cavity 78 is formed at one side of the piston 73. A segmented cylindrical projection 79 of the cylinder head 74 overlies the second cavity 78 and is adapted to displace a substantial portion of the volume of the second cavity 78 when the piston 73 approaches top dead center (FIGURE 8).

A fuel evaporation cavity 80 formed in the cylinder head 74 has an inlet opening 81 that extends through the projection 79 and terminates at its lower surface. An outlet opening 82 extends from the cavity 80 to an area in the lower cylinder head surface 75 that overlies the throat 77 of the cavity 76. A fuel impingement surface 83 defines the lower side of the fuel evaporation cavity 80 and extends from an area overlying the cavity 78 to an area that overlies the throat 77. Raised sides 84 are formed at both sides of the fuel impingement surface 83.

A fuel injection nozzle 85 is supported at an oblique angle in the cylinder head 74. The fuel injection nozzle 85 discharges from its discharge orifice through a short transfer conduit 86 into the fuel evaporation cavity 80. The fuel impingement surface 83 is disposed in the line of the injected fuel particles whereby a substantial portion of the injected fuel is deposited as a liquid upon the fuel impingement surface 83.

The fuel is injected during the intake stroke or at the beginning of the compression stroke. During the remaining of the intake stroke and during the initial stages of the compression stroke, the fuel will evaporate from the fuel impingement surface 83 to form an enriched mixture in the fuel evaporation cavity 80. As the piston 73 approaches its top dead center position, the squish air flow set up from the minimum clearance volume into the cavity 76 will cause some of the evaporated mixture to flow from the fuel evaporation cavity 80 through the outlet opening 82 into the cylinder bore 72. As the piston 73 more closely approaches top dead center (FIGURE 8), the cylinder head projection 79 will move into the second piston cavity 78 and commence to displace the air from the cavity 78. The displaced air will be driven through the inlet opening 81 into the fuel evaporation cavity 80. The high velocity of air flow through the cavity 80 will drive the mixture and whatever remaining liquid fuel is present upon the fuel impingement surface 83 out of the outlet opening 82 into the cavity 76 through the throat 77. The direction of flow is shown by the arrows.

A spark plug 87 is positioned in the cylinder head 74 with its ignition terminals 88 and 89 at the mouth of the outlet opening 82. At the time of ignition, the spark plug terminals 88 and 89 will be surrounded by a rich fuel-air mixture. Upon ignition the flame rapidly propagates into the cavity 76 causing an increase in temperature and pressure. The leaner mixture present in the cavity 76 will commence to burn because of the elevated temperature and pressure resulting in complete combustion.

Referring now to the embodiment shown in FIGURES 10–12, a cylinder block 91 having a cylinder bore 92 reciprocally supports a piston 93. A cylinder head 94 having a lower surface 95 encloses the cylinder bore 92. An induction port 96 is formed in the cylinder head 94. The flow of gases through the induction port 96 is controlled by a vertically disposed inlet valve 97. The lower face of the intake valve 97 lies in substantially the same plane as the lower surface 95 of the cylinder head 94. An exhaust valve (not shown) is also disposed in a vertical plane parallel to the intake valve 97 to control the flow of gases through an exhaust port (not shown).

A first cavity 98 is formed as a surface of revolution in the head of the piston 93. The cavity 98 is offset to one side of the axis of the cylinder bore 92 and opens into the cylinder bore through a throat 99. A squish induced air transfer into the cavity 98 is propagated during the compression stroke because of the rapidly decreasing volume between the area of the piston head 101 surrounding the throat 99 and the opposite cylinder head surface 95.

A second cavity 102 is formed in the head of the piston 93 at one side thereof. The cavity 102 has a segmented cylindrical shape. A segmented cylindrical projection 103 extends from the cylinder head 94 above the second piston cavity 102. The projection 103 is adapted to displace a substantial portion of the volume of the cavity 102 when the piston 93 is at top dead center (FIGURE 11).

The cylinder head projection 103 is formed with an internal fuel evaporation cavity 104. The cavity 104 opens through the lower surface of the projection 103 into the second piston cavity 102 as at 105. The fuel evaporation cavity 104 also has an outlet opening 106 in the side wall of the projection 103 that opens into the cylinder bore 92 above the piston 93 at top dead center.

A fuel injection nozzle 107 is disposed in the induction port 96 of the cylinder head 94. The fuel injection nozzle 107 has its discharge orifice 108 disposed to emit a stream of fuel particles from the induction port 96 when the intake valve 97 is open. A substantial portion of the injected fuel particles are deposited upon a fuel impingement surface 109 that forms the lower surface of the fuel evaporation cavity 104 (FIGURE 10). Because the discharge orifice 108 of the fuel injection nozzle 107 is positioned in the induction passage 96 and is shielded from combustion by the intake valve 97, greater reliability may be achieved with the use of a lower cost nozzle.

During the remainder of the intake and early stages of the compression stroke the fuel evaporates from the fuel impingement surface 109 to form a rich fuel-air mixture within the fuel evaporation cavity 104.

As the piston 93 approaches top dead center (FIGURE 11), the cylinder head projection 103 displaces a substantial volume of the second cavity 102. The displaced air enters the fuel evaporation cavity 104 through the opening 105 and is discharged into the clearance volume through the outlet opening 106. The high velocity air flow across the fuel impingement surface 109 will sweep any unevaporated liquid fuel particles through the outlet opening 106. The mixture is transferred across the head of the piston 93 into the first cavity 98 through the throat 99. The direction of air transfer is shown by the arrows in FIGURE 11.

A spark plug 111 is positioned in the cylinder head 94 with its ignition terminals 112 and 113 extending in the fuel evaporation cavity 104. At the time of ignition there will be a rich mixture in the cavity 104 to insure combustion. When combustion occurs within the fuel evaporation cavity 104, a rapid rise in temperature and pressure occurs. The pressure increase causes the gases to be expelled through the outlet opening 106 and increases the penetration into the first cavity 98.

It has been observed that in all of the desired embodiments of the invention a locally rich fuel-air mixture is present around the terminals of the spark plug at the time of ignition. Combustion, therefore, will always occur even though the total fuel charge in the cylinder bore would be insufficient to burn if totally mixed with the surrounding air. The formation of a heterogeneous mixture permits the power output of the engine to be varied by altering the amount of fuel present in the cylinder bore without necessitating throttling of the intake air.

In a typical combustion process employed in the disclosed combustion chambers, a charge of unthrottled pure air is drawn into the cylinder bore during the intake stroke. Fuel injection is commenced during the intake stroke or in the early portions of the compression stroke. The timing of the fuel injection is dependent upon engine load and the specific combustion chamber configuration. The duration of injection determines the power output of the engine. At least a portion of the injected fuel particles is deposited as a liquid upon the fuel impingement surface of the fuel evaporation cavity.

During the final stages of the compression stroke, the liquid fuel evaporates to form a locally rich fuel-air mixture within the fuel evaporation cavity. The squish induced air transfer through the fuel evaporation cavity drives a portion of the fuel-air mixture into the main cavity of the combustion chamber. At the time of ignition, a portion of the enriched fuel-air mixture will surround the terminals of the spark plug to insure ignition. When combustion begins, a rapid increase in temperature and pressure occurs that propagates rapidly into the main combustion cavity. The increased temperature and pressure along the flame front is sufficient to cause combustion of the leaner mixture that exists at partial loads.

It is to be understood that this invention is not limited to the exact constructions shown and described, but that various changes and modifications may be made without departing from the spirit and scope of the invention, as defined by the appended claims.

We claim:

1. An internal combustion engine comprising, a cylinder, a piston member reciprocating in said cylinder, a cylinder head member enclosing said cylinder to form a combustion chamber, a cavity formed in one of said members, said cavity opening through a throat into the squish area between said piston and said cylinder head members, said cavity having sufficient volume to promote a squish induced air transfer from said squish area into said cavity as the piston member approaches its top dead center position, a fuel impingement surface in said combustion chamber communicating at one side with said squish area and at another side with said throat for causing a portion of the squish induced air transfer to traverse said fuel impingement surface, a fuel injection nozzle having at least one discharge orifice disposed to deposit a substantial portion of its fuel spray upon said fuel impingement surface during injection, the squish induced air transfer across said fuel impingement surface being adapted to sweep the deposited liquid fuel into said cavity, and an ignition device positioned in the path of the swept fuel particles and contiguous to said fuel impingement surface for igniting the fuel particles.

2. An internal combustion engine comprising a cylinder, a piston reciprocating in said cylinder, a cylinder head enclosing said cylinder to form a combustion chamber, a cavity formed in the head of said piston and opening through a throat into the squish area between the surrounding piston head area and the adjacent cylinder head, said cavity having sufficient volume to promote a squish induced air transfer from said squish area into said cavity as the piston approaches its top dead center position, a fuel impingement surface in said combustion chamber communicating at one side with said minimum mechanical clearance volume and at another side with said cavity for causing a portion of the squish induced air transfer to traverse said fuel impingement surface, a fuel injection nozzle having at least one discharge orifice adapted to deposit a substantial portion of its fuel spray upon said fuel impingement surface during injection, the squish induced air transfer across said fuel impingement surface being adapted to sweep a portion of the deposited fuel particles into said cavity through said throat, and an ignition device positioned in said cylinder head contiguous to said fuel impingement surface and in the path of the swept fuel particles for igniting said fuel particles.

3. An internal combustion engine comprising a cylinder, a piston reciprocating in said cylinder, a cylinder head enclosing said cylinder to form a combustion chamber, a cavity formed in the engine and opening through a throat into the squish area between the piston head and the adjacent cylinder head, said cavity having sufficient volume to promote a squish induced air transfer from said squish area into said cavity as the piston approaches its top dead center position, a fuel evaporation chamber bounded in part by a fuel impingement surface, said fuel evaporation chamber having an inlet opening in communication with said squish area and an outlet opening in communication with said throat whereby a portion of the squish induced air transfer takes place through said fuel evaporation chamber, a fuel injection nozzle having at least one discharge orifice adapted to deposit a substantial portion of its fuel spray upon said fuel impingement surface during injection, the liquid fuel deposited upon said fuel impingement surface being adapted to evaporate and form an enriched fuel-air mixture in said fuel evaporation chamber, the squish induced air transfer through said fuel evaporation chamber being adapted to transfer the enriched fuel-air mixture into said cavity, and an ignition device positioned in the path of fuel transfer.

4. An internal combustion engine as defined by claim 3 wherein the cavity is formed in the piston and the fuel evaporation chamber is formed in the cylinder head.

5. An internal combustion engine as defined by claim 3 wherein the ignition device is positioned in the fuel evaporation chamber.

6. An internal combustion engine as defined by claim 3 wherein the ignition device is positioned contiguous to the outlet opening of the fuel evaporation chamber.

7. An internal combustion engine as defined by claim 3 wherein the fuel injection nozzle is disposed within the fuel evaporation chamber.

8. An internal combustion engine as defined by claim 3 wherein the ignition device and the fuel injection nozzle are disposed in the fuel evaporation chamber.

9. An internal combustion engine comprising a cylinder, a piston member reciprocating in said cylinder, a cylinder head member enclosing said cylinder, a first cavity formed in said engine and opening through a throat into said cylinder, said first cavity having sufficient volume to cause a squish induced air transfer from the squish area between the piston member head and the opposing cylinder head member surface into said first cavity upon the approach of the piston member to top dead center, a second cavity formed in one of said members, a projection extending from the other of said members into said second cavity when the piston member is at top dead center, a fuel evaporation chamber bounded at least in part by a fuel impingement surface, an inlet opening extending from said projection into said fuel evaporation chamber, an outlet opening extending from said fuel evaporation chamber to a point contiguous to said first cavity, said projection being adapted to displace a substantial portion of the volume of said second cavity as said piston member approaches its top dead center position to cause an air flow through said evaporation chamber from said inlet opening to said outlet opening and into said first cavity, a fuel injection nozzle having at least one discharge orifice disposed to deposit a substantial portion of its fuel spray as a liquid upon said fuel impingment surface during injection, the deposited fuel being adapted to evaporate to form an enriched fuel-air mixture in said fuel evaporation chamber, the air transfer through which said fuel evaporation chamber causing transfer of the enriched mixture into said first cavity, and an ignition device position in the path of the transferred fuel-air mixture.

10. An internal combustion engine comprising a cylinder, a piston member reciprocating in said cylinder, a cylinder head member enclosing said cylinder to form a combustion chamber, a first cavity formed in said piston member and opening through a throat into the squish area between the surrounding piston member head area and the opposing cylinder head member surface, said first cavity having sufficient volume to cause a squish induced air transfer from the squish area into the cavity as the piston member approaches top dead center, a second cavity formed in one of said members, a projection formed in the other of said members and adapted to extend into said second cavity when said piston member is at top dead center, a fuel evaporation chamber bounded in part by a fuel impingement surface and extending at least in part into said projection, an inlet opening extending from said fuel evaporation chamber and opening through said projection, an outlet opening extending from said fuel evaporation chamber into said combustion chamber contiguous to said throat, said projection being adapted to displace a substantial portion of the volume of said second cavity when the piston member is at top dead center to cause an air transfer from said second cavity through said fuel evaporation chamber into said first cavity, a fuel injection nozzle having at least one discharge orifice disposed to deposit a substantial portion of its fuel spray as a liquid upon said fuel impingement surface during injection, the deposited liquid fuel being adapted to evaporate and form a rich fuel-air mixture within said fuel evaporation chamber, the air transfer through said fuel evaporation chamber being adapted to transfer the rich fuel-air mixture into said first cavity, and an ignition device intersecting the path of the transferred fuel-air mixture.

11. An internal combusion engine comprising a cylinder, a piston reciprocating in said cylinder, a cylinder head enclosing said cylinder to form a combustion chamber, a first cavity formed in said piston and opening through a throat into the squish area between the surrounding piston head area and the opposing cylinder head surface, said first cavity having sufficient volume to cause a ssquish induced air transfer from the squish area into said first cavity as the piston approaches top dead center, a second cavity formed in the head of said piston, a projection extending from said cylinder head toward said second cavity, a fuel evaporation chamber formed in said cylinder head and extending at least in part into said projection, said fuel evaporation chamber being bounded at least in part by a fuel impingement surface, an inlet opening extending from said fuel evaporation chamber through said projection and opening in the lower surface of said projection, an outlet opening extending from said fuel evaporation chamber and opening into said combustion chamber at a point contiguous to said throat, said projection being adapted to displace a substantial portion of the volume of said second cavity when the piston is at top dead center to cause an air transfer from said second cavity through said fuel evaporation chamber into said first cavity, a fuel injection nozzle having at least one discharge orifice disposed to deposit a substantial portion of its fuel spray as a liquid upon said fuel impingement surface during injection, the deposited liquid fuel being adapted to evaporate and form a rich fuel-air mixture within said fuel evaporation chamber, the air transfer through said fuel evaporation chamber being adapted to transfer the rich fuel-air mixture into said first cavity, and an ignition device intersecting the path of the transferred fuel-air mixture.

12. An internal combustion engine as defined by claim 11 wherein the fuel injection nozzle is supported in the cylinder head member and has its discharge orifice opening directly into the fuel evaporation chamber.

13. An internal combustion engine as defined by claim 12 wherein the ignition device is positioned within said fuel evaporaton chamber.

14. An internal combustion engine as defined by claim 12 wherein the ignition device comprises a spark plug positioned in the cylinder head member and having its spark terminals contiguous to the outlet opening of said fuel evaporation chamber.

15. An internal combustion engine having a cylinder, a piston reciprocating in said cylinder, a cylinder head enclosing said cylinder to form a combustion chamber, an inlet port formed in said cylinder head for delivering a charge to the combustion chamber, a valve movably supported by said cylinder head for controlling the flow of the charge through said inlet port into said combustion chamber, a cavity formed in said piston and opening through a throat into the squish area formed between the surrounding piston head area and the adjacent cylinder head surface, said cavity forming a substantial portion of the minimum clearance volume to establish a squish induced air transfer through said throat into said cavity during compression, a fuel impingement surface in said combustion chamber disposed to be traversed by at least a portion of the air being transferred into said cavity during compression, a fuel injection nozzle having a discharge orifice positioned in said inlet port, said discharge orifice being disposed to direct its fuel spray through said inlet valve, when the latter is opened, at least a portion of said fuel spray being deposited upon said fuel impingement surface as a liquid, the deposited fuel being transferred into said cavity upon compression by the air flow across said fuel impingement surface, and an ignition device disposed contiguous to said fuel impingement surface and intersecting the path of fuel transfer.

16. An internal combustion engine having a cylinder, a piston member reciprocating in said cylinder, a cylinder head member enclosing said cylinder to form a combustion chamber, a cavity formed in one of said members and opening through a throat into the squish area between the piston member head and adjacent cylinder head surface, a projection extending from the other of said members, said projection having a periphery of substantially the same size and shape as said throat and being adapted to extend into said throat when the piston member is at top dead center, said projection being formed with a fuel impingement surface open at one side to said squish area and at another side to said cavity through said throat, said projection being adapted to direct the squish induced air flow across said fuel impingement surface into said cavity as the piston member approaches top dead center, a fuel injection nozzle disposed to deposit a substantial portion of its fuel spray upon said fuel impingement surface during injection, the deposited fuel being transferred into said cavity by the air flow across said fuel impingement surface during compression, and an ignition device disposed contiguous to said fuel impingement surface and intersecting the path of fuel transfer.

17. An internal combustion engine having a cylinder, a piston reciprocating in said cylinder, a cylinder head enclosing said cylinder to form a combustion chamber, a cavity formed in the head of said piston and opening through a throat into the squish area between the surrounding piston head and the adjacent cylinder head surface, a projection extending from said cylinder head and overlying said throat, the lower face of said projection being adapted to extend into said throat when the piston is at top dead center, the side wall of said projection being of substantially the same size and same shape as said throat in the area of said throat, said cavity having sufficient volume to establish a squish induced air transfer from the squish area into said cavity during the portion of the compression stroke that said projection does not obstruct said throat, a fuel evaporation chamber formed in said projection and opening through said side wall into the squish area, an outlet opening extending from said fuel evaporation chamber through the lower surface of said projection, the obstruction of said throat by said projection during the latter portion of the compression stroke causing a squish induced air transfer through said fuel evaporation chamber from the squish area to said cavity, a fuel impingement surface bounding the lower portion of said fuel evaporation chamber, a fuel injection nozzle positioned in said cylinder head and having its discharge orifice opening into said fuel evaporation chamber, said fuel injection nozzle being adapted to deposit at least a portion of its fuel spray as a liquid upon said fuel impingement surface during injection, and an ignition device positioned in said cylinder head contiguous to the outlet opening of said fuel evaporation chamber.

18. An internal combustion engine having a cylinder bore slidably receiving a reciprocable piston member therein, a cylinder head member closing one end of said bore and together with said bore and piston member defining a combustion chamber therebetween, one of said members having a cavity therein opening into and forming a portion of said combustion chamber, said cavity opening defining a constriction to flow into said cavity to create a pressure drop across said opening whereby the piston member during compression establishes a transfer into said cavity of fluid media in the remaining portion of said chamber, a fuel impingement element associated with said chamber and having a surface disposed to be traversed by at least a portion of the fluid media being transferred into said cavity during compression, fuel distribution means positioned to deposit as a liquid at least a portion of fuel upon said fuel impingement surface, the fuel being transferred into said cavity during compression by the flow of fluid media across said fuel impingement surface, and an ignition device disposed adjacent said fuel impingement surface and in the path of fuel and fluid media mixture transfer for ignition of the fuel and fluid media mixture.

19. An internal combustion engine having a cylinder bore slidably receiving a reciprocable piston member therein, a cylinder head member closing one end of said bore and together with said bore and piston member defining a combustion chamber therebetween, one of said members having a cavity therein opening into and forming a portion of said combustion chamber, said cavity having a volume greater than the minimum clearance volume of the remaining portion of said combustion chamber, said cavity opening defining a constriction to flow into said cavity to create a pressure drop across said opening whereby the piston member during compression establishes a squish induced transfer into said cavity of fluid media in the remaining portion of said chamber, a fuel impingement element associated with said chamber and having a surface disposed to be traversed by at least a portion of the fluid media being transferred into said cavity during compression, fuel distribution means positioned to deposit as a liquid at least a portion of fuel upon said fuel impingement surface, the fuel being transferred into said cavity during compression by the flow of fluid media across said fuel impingement surface, and an ignition device disposed adjacent said fuel impingement surface and in the path of fuel and fluid media mixture transfer for ignition of the fuel and fluid media mixture.

20. An internal combustion engine having a cylinder bore slidably receiving a reciprocable piston member therein, a cylinder head member closing one end of said bore and together with said bore and piston member defining a combustion chamber therebetween, said piston member having a cavity therein contiguous to and opening into and forming a portion of said combustion chamber, said cavity having a volume greater than the minimum clearance volume of the remaining portion of said combustion chamber, said cavity opening defining a constriction to flow into said cavity to create a pressure drop across said opening whereby the piston member during compression establishes a squish induced transfer into said cavity of fluid media in the remaining portion of said chamber, a fuel impingement element contiguous with said chamber and having a surface disposed to be traversed by at least a portion of the fluid media being transferred into said cavity during compression, fuel distribution means positioned to deposit as a liquid at least a portion of fuel upon said fuel impingement surface, the fuel being transferred into said cavity during compression by the flow of fluid media across said fuel impingement surface, and an ignition device disposed adjacent said fuel impingement surface and in the path of fuel and fluid media mixture transfer for ignition of the fuel and fluid media mixture.

References Cited by the Examiner

UNITED STATES PATENTS

| 887,393 | 5/1908 | Hasselwander | 123—33 |
|---|---|---|---|
| 1,691,182 | 11/1928 | Davol | 123—32 |
| 2,223,090 | 11/1940 | Boxan | 123—32.91 |
| 2,808,036 | 10/1957 | Von Seggern et al. | 123—32 |
| 3,015,321 | 1/1962 | Stumpfig et al. | 123—30.3 |
| 3,102,521 | 9/1963 | Slemmons | 132—32 |

FOREIGN PATENTS 986,326  3/1951  France.

MARK NEWMAN, *Primary Examiner.*

RICHARD B. WILKINSON, *Examiner.*

L. M. GOODRIDGE, *Assistant Examiner.*